(12) United States Patent
Cherng et al.

(10) Patent No.: US 7,827,883 B1
(45) Date of Patent: Nov. 9, 2010

(54) CUTTING DIE AND METHOD OF FORMING

(75) Inventors: Tzyh-Chyang Cherng, Howell, MI (US); Yu Zhang, Troy, MI (US)

(73) Assignee: Bernal, Inc., Rochester Hills, MI (US)

( * ) Notice: Subject to any disclaimer, the term of this patent is extended or adjusted under 35 U.S.C. 154(b) by 0 days.

(21) Appl. No.: 09/160,991

(22) Filed: Sep. 25, 1998

Related U.S. Application Data

(63) Continuation of application No. 08/602,379, filed on Feb. 16, 1996, now abandoned.

(51) Int. Cl.
*B21K 5/20* (2006.01)

(52) U.S. Cl. ............... 76/107.8; 76/107.1; 76/115; 219/76.1; 219/77; 219/121.64; 219/121.66

(58) Field of Classification Search ........... 76/101.1, 76/107.1, 115, DIG. 5, 107.8; 83/663; 219/121.66, 219/77, 76.1–76.16, 121.63, 121.64, 121.85; 228/155, 160

See application file for complete search history.

(56) References Cited

U.S. PATENT DOCUMENTS

| 3,063,310 | A | * | 11/1962 | Connoy | 219/77 |
|---|---|---|---|---|---|
| 3,240,914 | A | * | 3/1966 | Hill et al. | 219/77 |
| 3,905,283 | A | * | 9/1975 | Baker | |
| 3,952,179 | A | * | 4/1976 | Baker | |
| 4,085,496 | A | * | 4/1978 | Malkani et al. | 219/77 |
| 4,299,860 | A | * | 11/1981 | Schaefer et al. | 427/556 |
| 4,323,756 | A | * | 4/1982 | Brown et al. | |
| 4,383,784 | A | * | 5/1983 | Gulbrandsen | 76/115 |
| 4,393,738 | A | * | 7/1983 | Heyden | |
| 4,608,895 | A | * | 9/1986 | Bell et al. | |
| 4,745,256 | A | * | 5/1988 | Shubert | 219/77 |
| 4,837,417 | A | * | 6/1989 | Funk | 219/77 |
| 4,864,094 | A | * | 9/1989 | Saltzman et al. | 219/77 |
| 4,927,992 | A | * | 5/1990 | WHitelow et al. | |
| 5,361,968 | A | * | 11/1994 | Tanaka et al. | 219/77 |
| 5,417,132 | A | * | 5/1995 | Cox et al. | |
| 5,448,035 | A | * | 9/1995 | Thutt et al. | 219/77 |
| 5,449,536 | A | * | 9/1995 | Funkhouser et al. | 427/597 |

(Continued)

FOREIGN PATENT DOCUMENTS

DE 2907325 A1 * 9/1980

(Continued)

OTHER PUBLICATIONS

Kato Yoshihisa, Manufacture for Tool, 62224527, Patent Abstracts of Japan, Oct. 1987.*

(Continued)

*Primary Examiner*—Hwei-Siu C Payer
(74) *Attorney, Agent, or Firm*—Whitham, Curtis, Christoffeson & Cook, P.C.

(57) ABSTRACT

A cutting die is formed by scanning a laser beam along a path corresponding to a blade pattern, and introducing a selected powder to build up an integral blade of high grade, and hard-to-wear material on the relatively softer die body. The final blade shape is machined or produced by EDM or milling. Further hardening by heat treatment is optional. Other heat sources and cladding materials could be used.

26 Claims, 1 Drawing Sheet

U.S. PATENT DOCUMENTS

| | | | | |
|---|---|---|---|---|
| 5,580,472 | A | * 12/1996 | Maybon | 219/121.66 |
| 6,122,564 | A | * 9/2000 | Koch et al. | 700/123 |
| 6,146,476 | A | * 11/2000 | Boyer | 148/525 |
| 7,139,633 | B2 | * 11/2006 | Mazumder et al. | 700/123 |

FOREIGN PATENT DOCUMENTS

| | | | | |
|---|---|---|---|---|
| JP | 06297055 | * | 10/1994 | 76/107.1 |

OTHER PUBLICATIONS

Tanaka Keizo et al., Manufacture of Press Die, 06023448, Patent Abstracts of Japan, Feb. 1994.*

Shiraishi Motoatsu et al., Casting Die for Trimming and its Production, 63040621, Patent Abstracts of Japan, Feb. 1988.*

Murphy et al., The rapid Manufacture of Metallic Components by Laser Surface Cladding, pp. 803-807, 1994.*

Jinbo Takeshi et al., Die, 57058990, Patent Abstracts of Japan, Apr. 1982.*

* cited by examiner

CUTTING DIE AND METHOD OF FORMING

This is a Continuation application prior application Ser. No. 08/602,379, filed on Feb. 16, 1996 now abandoned for CUTTING DIE AND METHOD OF FORMING.

BACKGROUND OF THE INVENTION

This invention relates to cutting dies and, in particular, to the manufacture of dies for cutting various stock materials.

Cutting dies are known for cutting or severing one portion of a stock material from another. For example, cutting dies are used for cutting sheets of paperboard or plastic or metal into predetermined blanks. In one form of known cutting operation, two rotary cylinders, each having small integral cutting blades extending radially from the cylindrical surface, are juxtaposed so that when rotated, the blades engage generally opposite sides of a work stock and cooperate to sever the stock into a blank, the shape of which is determined by the blade configuration. One such operation is illustrated in U.S. Pat. No. 4,608,895, incorporated herein by reference.

The process of forming each cylindrical die requires certain process treatments to insure the blades will provide the desired cutting action over a long operational life. Specifically, the blades must be very hard in order to provide sufficient blade life before reconditioning is required.

In one form of die preparation then, an entire die cylinder of appropriate size is heat-treated to bring the cylinder's surface to a requisite hardness, on the order, for example of about HRC 60 on the Rockwell hardness scale. Since the blades are formed integrally from the cylinder, the next process is to remove cylinder material to form and define the integral blades which are to extend radially outwardly from the cylinder's surface. While it might be possible to mill the surface down to form the blades, the hardness of the cylinder makes milling a bad choice.

Accordingly, it is known to use the process of electro discharge machining (EDM) to form the die. In this process, a graphite cylinder is formed in the negative configuration of the to-be-formed die cylinder and blades. The graphite cylinder and die cylinder are juxtaposed in an electric discharging environment so the die cylinder metal is eaten away, leaving the hardened cutting blades extending upwardly from the relieved cylinder surface. This is a slow process and, where the cylinder is large, such as twelve inches or even more in diameter and several feet long, the process can take days.

Manufacturers have attempted to form the die first, then harden it. This reversed procedure does not work well. The cylinder and its extended blades must be heated to austentiting temperature, which is about 1900° F. to 2000° for D2 steel, in order to produce the desired blade hardness. When such a pre-formed cylinder is removed from the furnace to cool down, it may distort or crack in the areas around or in the die blades. This distortion is believed to be due to several principles, including thermal deformation and phase transformation deformation resulting from differential cooling rates between the relative low mass blades and the high mass cylinder, and between surface and interior of a die.

More particularly, when the cylinder cools, its surface cools faster than the interior. Uneven volume change due to both thermal and phase transformation causes the die to crack or distort beyond acceptable limits. Also, in order to produce the hardening required, the metal must be heated to the necessary level to cause the desired phase transformation. While such phase transformation in the blades is desired in order to produce the desired hardness, the fast cooling required from austentiting temperature of about 1900° F. to produce the phase transformation is a cause of undesirable cracking and distortion of the blades on the cylinder due to the varied rates of phase transformation between die surface and interior. These phase transformations in the metal take place at different rates due to the heat distribution throughout the varied mass configuration of the blades and the cylinder. This produces volumetric or density changes which can cause cracking or distortion, particularly in the blades and on the cylinder surface.

Thus the difficulty faced by a die manufacturer is the conflict between the need for hard blades for die life and the preferability of soft surface material for formation of the die blades. When the die is first hardened, a slow, expensive and capital intensive EDM process is required to form the blades. If the blades are first milled, and then the cylinder heated and cooled to harden the blades, distortion and cracking may result.

Accordingly, it is one objective of the invention to provide an improved process for manufacturing a cutting die.

In order to overcome certain of the foregoing difficulties, applicant has proposed and filed on even date herewith a related application, entitled "Cutting Die and Method of Making", directed to the process of making a cutting die by first forming the blades on a die surface such as a cylinder, and then hardening the blades by scanning them with a laser mounted for five-axis movement and controlled by CNC technology. This provides a process for efficiently forming cutting dies from such material as 4150 medium carbon, low alloy steel. The blades are first milled before hardening and then heated and hardened by the laser so there is no undue or significant distortion or cracking. Such process is particularly effective for materials such as 4150 medium carbon, low alloy steel as noted.

One difficulty in that process is that of annealing portions of previously-hardened intersecting blades and thus causing a soft spot in such blades which might reduce die life or the functional time between blade reconditioning.

Also, that process is somewhat material-dependent, since it is difficult to use materials such as high carbon, high alloy steel such as that steel known as D-2, or even higher grades of steel. Such higher grade steel, if usable in a cutting die, would provide longer useful life. However, if the die of D-2 steel is made by first milling and then laser hardening is attempted, the hardening process is difficult to control. If the laser intensity and traverse speed are controlled to produce the desired case hardening depth, the steel blade suffers the possibility of surface melting. On the other hand, faster traverse speed or reduced beam intensity may not raise the temperature high enough to harden the D-2 blade to sufficient depth. While the heat parameters might be successfully controlled to produce desired hardening, these narrow criteria render the process more difficult to control.

Finally, another problem with that laser hardening process when using higher grade steel is that of material cost. Frequently the cutting dies are formed integrally from cylinders which are ten or more inches in diameter and several feet-long. Such cylinders weigh hundreds or thousands of pounds. Thus, use of a high grade steel such as D-2, which may cost three to four times as much as plain carbon steel or low alloy steel, such as 1045 or 4150 steel, for example, substantially raises the cost of the finished die. Moreover, use of a yet higher grade of steel, providing even longer life, such as that steel known as CMP10V or CMP15V may be eight times the cost of D-2 steel. Use of such even higher grades of steel even more substantially increases material costs. Also it is extremely difficult to direct machine these materials.

Since the blades of the cutting dies do the cutting work, it accordingly would be preferable to select the die material based on the parameters needed for the blade, rather than on the parameters demanded by the response of the entire die cylinder to the heat treating or intended machining processes, and by the blade support and toughness factors required in the cylinder. In the case of an integral cutting die such as the cylindrical die described, however, selection of a higher grade steel, such as D-2, to satisfy blade parameters requires the entire cylinder to be of the high grade, and thus a much more costly die.

Accordingly, it has been a further objective of the invention to provide an improved process for making a cutting die having hard, long-life blades of high grade steel at substantially the same cost as cutting dies formed integrally of lower grade steel.

A further objective of the invention has been to provide a process for making a cutting die which process allows for the selection of material based on desired blade parameters and life without unduly increasing the cost of the die.

To these ends, and according to one embodiment of the invention, a process for forming a cutting die includes scanning a die surface with a laser through a desired blade pattern, introducing selected powder into the area being scanned by the laser beam to build up an integral blade along the scan pattern and thereafter forming the final shape of the blade by milling, grinding, electric discharge machining (EDM) or other suitable process. Optionally, the formed blade may then additionally be heat treated and/or cryogenic treated, if required. The blade is formed preferably in one laser pass wherein a blade height of about two millimeters is produced. Additional passes might be used where higher blades are desired. Also, lasers of higher power can be used to build higher blades in a single pass, but the cost of higher powered lasers than that necessary for a two millimeter blade height, can be prohibitive.

Such a cladding process as is described above provides numerous advantages in forming cutting dies. First, the materials for the die blades and for the die cylinder can be selected respectively based on the varied parameters of each, such as blade hardness and life on the one hand, and die cylinder toughness on the other, without the huge cost increases when the entire die body must be of the selected blade material.

Secondly, the process produces a metallurgical bonding of powdered blade material to the die body material. Such a bond is much more secure than a mechanical bond as might result from conventional surface coating techniques, and essentially produces a die blade of high grade material integrally with a die body of lower grade, less costly material.

Thirdly, once the blade is formed, it may be finally shaped by any suitable technique, such as by EDM or by grinding or by milling. EDM shaping is preferred. As compared, however, to prior processes where the entire blade is formed by an EDM process removing cylinder material in relief, the final shaping process is relatively quicker and less costly. Only very small portions of the formed blade need be removed to form the final, preferably tapered blade shape with each side inclined about 25° to 35°, and no cylinder material need be removed to define the blade.

Thus, this cladding process produces a distinct blade feature on a die cylinder or body, useful as a cutting blade. The powdered material may be D-2 steel or a higher grade, such as CMP10V or CMP15VI, for example, for producing a very hard, long-life blade. It is not necessary, however, to use such high grade material in the die cylinder or body, which can be made of 4150 or even 1045 steel, for example sufficient to provide a strong die body. Material cost is substantially reduced while, at the same time, blade performance and life is substantially increased. Blade material is selected based on blade performance criteria while die body material is selected based on die body parameters, yet an integral cutting die is formed at a lower material cost than previously attainable when enhanced blade life is desired.

These and other objectives and advantages will become even more readily apparent from the following detailed description of a preferred and alternative embodiment of the invention, and from the drawings in which.

Figure 1:
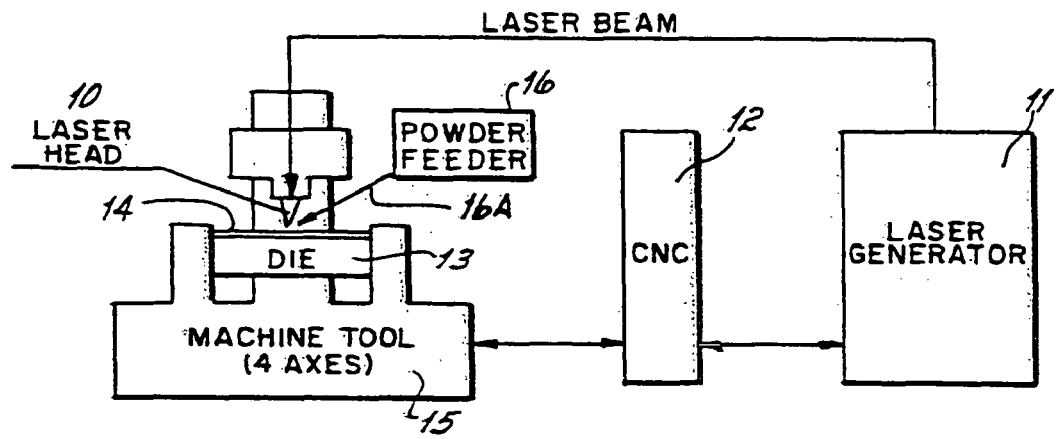
FIG. 1 is a schematic illustration of a process according to the invention.

Turning now to the drawings, a diagrammatic illustration of the apparatus and process for carrying out the invention is shown in FIG. 1. A $CO_2$ laser head 10 and generator 11, controlled by a CNC 12, are operationally interconnected. Such a $CO_2$ laser head 10 and laser generator 11 can be, for example, the laser components manufactured by TRUMPF, Incorporated of Farmington, Conn. according to its model no. TLF 2600 turbo. The path and density of laser beam can be controlled by the CNC 12. One such CNC is made by Boston Digital Corp. of Boston, Mass. under the model no. BD85-2. The die is mounted on a three, and preferably four, axis machine tool 15. One such machine tool is made by Boston Digital Corp. under the model no. BD85-2. Powder feeder 16 can be either a side feeder or coaxial feeder which is preferable. Such a side feeder is manufactured by Sulzer Metco (Westbury, Inc) of Cincinnati, Ohio under model METCO Type 9MP. A die cylinder 13 is shown with the blade 14 being formed therein. The die cylinder is rotated by the machine tool 15, which is also controlled by the CNC machine 12 to coordinate with the laser head 10 and the laser generator 11. The :powder feeder 16 is associated with the laser head 10, so as to selectively introduce powder into the area being clad, as will be described.

It will be appreciated that the movement of laser beam with respect to die surface is controlled by CNC 12. Either laser head 10 or die cylinder 13 moves along the path corresponding to the desired configurations of the die blades to be extended therefrom.

Figure 2:
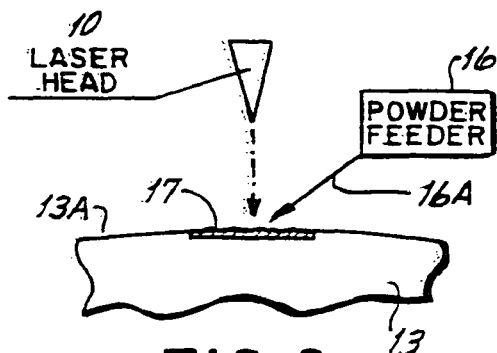
FIG. 2 is a schematic illustration of blade formation on a die cylinder by the process according to the invention.
Figure 3:
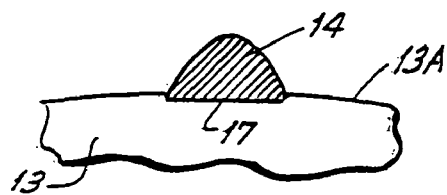
FIG. 3 is a partial cross-sectional view of a blade formed by the process of the invention and before shaping.

Turning now to FIG. 2 There is illustrated a part of the process of the invention. The laser beam 10 is scanned along the die surface 13A, so as to melt or "puddle" an area 17 in the surface 13A, along a path corresponding to a desired blade pattern. Upon such melting or puddling, the powder 16A is fed into the area being clad by the laser so that in one pass along the surface 13A as illustrated in FIG. 3, a die blade of half-ellipse cross-sectional dimension is formed. To state another way, powder 16 is fed into the area of the puddle formed in the path by previous heating by the laser beam 10 of the path while heating the path with the laser beam 10. The material of the die body 13 is selected to conform to the desired parameters in the die body for toughness. Ordinary, medium carbon plain steels or medium carbon low allow steels such as 1045 or 4150 steel, for example, may be used.

In contrast, the material which is preferably introduced in powder form, to form the blade 14, may be of another material selected based on the desired parameters of the die blade. This material can be a very high grade steel, such as CMP10V or CMP15V, or a metal-ceramic composite, such as a nickel base superalloy plus 30-40% (volume fraction) tungsten carbides. These materials, by definition, include carbides, and are compositionally different and of greater hardness than base materials such as medium carbon plain steels or medium carbon low alloy steels.

Presently, the deposition of powder through a powder nozzle, for example (not shown), forms a generally half ellipse cross-sectional die blade 14 as illustrated in FIG. 3. It is preferable to have the final die blade in a cross-sectional profile with edges which are somewhat tapered such as, for example, at about 25° to about 35°. Such die blade shapes, for example, are disclosed in U.S. Pat. No. 4,608,895, which render the die blades suitable for contact with an opposing die for cutting a work piece inserted therebetween. U.S. Pat. No. 4,608,895 also depicts blades that meet or intersect each other, which as stated above, was a problem with prior processes.

Figure 4:
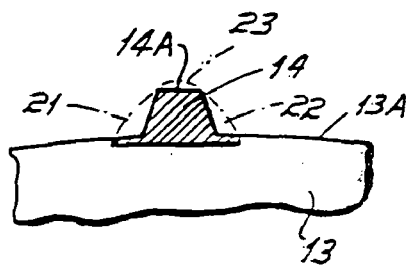
FIG. 4 is a view similar to FIG. 3 but showing the blade portions removed in final shaping.

FIG. 4 illustrates the desired final shape of the die blade 14. In FIG. 4, it will be appreciated that areas 21, 22 and 23 have been removed from the die blade 14, so the die blade 14 is of tapered or truncated configuration in cross-section.

It will be appreciated that it is only necessary to remove the relatively small areas 21, 22 and 23 to form the final die blade 14 from the half-ellipse shape of the die blade as illustrated in FIG. 3. As a result of the cladding process by which the die blade material is built up, the die blade is formed integrally with the die body 13 and a metallurgical bonding is produced between the die blade and the die body. Once the blade 14 is finally shaped, as shown in FIG. 4, it can be readily used as a cutting die.

It may be desirable to further harden the die blade and this may be accomplished by any suitable technique, such as by raising the die blade material to a temperature sufficient for further strengthening that material and/or by cryogenic treating the clad tracks to eliminate the remaining austenite in the cladding material. For example, the die blade could be treated by scanning a laser beam along the die blades where the parameter of the traverse speed and intensity are appropriate to produce the optimum microstructures and hardness. It will be appreciated, however, that by virtue of the use of very high quality steel in the forming of the blade, such as those mentioned above, the optional heat treating steps for strengthening die blade may be unnecessary, because the high quality steel can inherently provide a hardness equivalent to the final desired hardness of the blade. Alternatively, localized hardening might be accomplished by induction heating.

The final shape and size of the die blade are important. The die blade must be high enough to provide the desired cutting of the desired workpiece. For many applications, it has been found that a die blade of approximately 1.5 to 2.0 millimeters is high enough for a large number and variety of applications. Where the die blade is to be tapered, it has also been found that, after blade shaping, the top surface 14A of the die blade, as shown in FIG. 4, will be approximately 0.035 inches wide. Such a die blade would be suitable for rotary pressure cuts, for example. On the other hand, if it is desired to produce crush cut die blades, the width of the die blade top 14A may be, for example, 0.001-0.002 inches.

It will be appreciated that the final shaping of the die blade, as illustrated in FIG. 4, may be carried out by any suitable process. It is preferred to use an electronic discharge machine (EDM) process to remove the small amount of material necessary on each side of the die blades. Of course, the die blades could be ground or milled into the desired shape.

Figure 5:
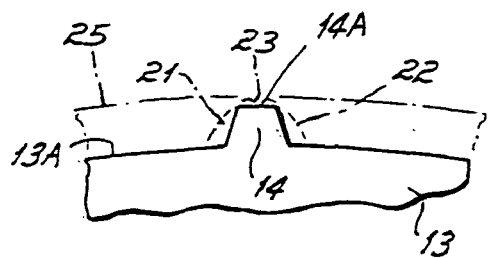
FIG. 5 is an illustrative view similar to FIG. 4 but contrasting the formation process herein with previous techniques of blade formation from the die cylinder material.
Figure 6:
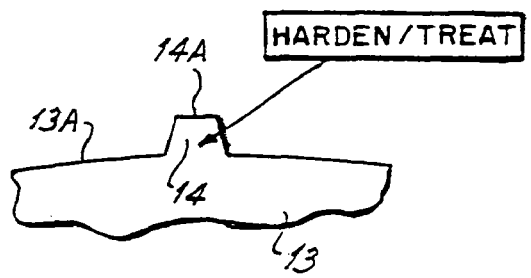
FIG. 6 is a view similar to FIG. 4 but illustrating an optional heat treating or hardening step.

Turning now to the illustration of FIG. 5, there is shown a die blade 14 formed according to the invention on a die surface 13A of a die body 13. The phantom line 25 is used to contrast the process of the invention with prior processes where the die blades were formed integrally from the die body. For example, in a prior process, a die body may have had an outer periphery 25. In order to form a die blade 14, it was thus necessary to machine away or remove or relieve all the material of the die body from periphery 25 down to a surface 13A, except for the remaining blade material illustrated by the blade 14 in FIG. 5.

It will be appreciated that, according to the invention, the starting material is a die body 13 having a surface 13A and that the die blade 14 is built up as a feature on the die surface 13A. It is thus not necessary to start with a cylinder having a periphery such as 25 and then grind or remove away the material illustrated between the surface 13A and the phantom line 25. Instead, the only shaping required is as illustrated in FIG. 4, where final shaping of the sides of the die blade is performed with only material designated at 21, 22 and 23 being removed. It will also be appreciated that, as contrasted with the prior processes, the die blade 14 can be formed of any suitable materials, based on the desired parameters for the die blade itself, and is not necessarily the same material as the die body.

Accordingly, very high grade materials can be utilized in the formation of the die blades without purchasing an entire die cylinder made of the same high grade and high cost steel.

Turning now to the process of this invention, it will be appreciated that a laser of approximately two kilowatt or above is useful in cladding or building up the die blade material. Die blades of approximately two millimeters or somewhat greater in height may be produced in a single pass with such a laser. It would be possible to build up the die blades by multiple laser passes assuming, of course, that the intersections of the various layers did not present a usage or a wear problem in the final die blade.

It will also be appreciated that lasers of higher power could be utilized to build up die blades of significantly higher or greater depth in a single pass, or blade metal with a higher melting temperature, however, much higher performance lasers would be necessary and these cost substantially more. The ability to manufacture cutting dies having blades of exceedingly hard material and thereby increasing the useful life of the cutting die, makes it unnecessary to produce die blades of such height as a softer blade which would be required for a large number of reconditioning cycles. Presently, blades of otherwise unnecessary height are the case with cutting dies manufactured of relatively lower grade steels, even though they are hardened.

It should be appreciated that in this invention, a $CO_2$ laser which can locally melt die surface and powder. However, the laser generation medium is not limited to $CO_2$ gas. Any other types of lasers which use different mediums could also be applied if they can generate enough power.

Finally, it should be appreciated that in this invention, the blades can be built up via cladding using a heating source (laser beam) and a cladding material supply (powder). However, the heating source which is used to melt cladding material and die surface is not limited to lasers. Any other heating sources which can quickly raise temperature on the selected area could be used in this invention, for example, thermal spraying gun, ion beam, electron-beam and plasma transfer arc, etc. On the other hand, the cladding materials are not limited to powder. For example, welding wire, gaseous materials, liquid materials, might be used without departing from the scope of the invention.

Having now described the preferred embodiment and optional features of the invention, other advantages and modifications will become readily apparent to those of ordinary skill in the art without departing from the scope of the invention, and the applicant intends to be bound only by the claims appended hereto.

What is claimed:

1. A process for producing a cutting die having a metal base which carries a sharpened ridge extending along a predetermined path thereon, said ridge being of a composition distinct from said metal base, comprising the steps of;
    a) scanning in an area along said path with a laser beam to heat the metal base to form a puddle, an area of said puddle being greater than an area of said metal base on which said laser beam directly impinges and simultaneously supplying powdered metal having a composition distinct from said metal base to said puddle along said predetermined path via a tube moving concurrently with and radially spaced from an axis of said laser beam so that said laser beam melts a thin layer of the metal base to form said puddle along said path and the metal powder being delivered to the base is melted in said puddle and at a surface thereof and thus forms a band of fused metal powder along said path,
    b) repeating steps a) so as to heat and melt a thin layer of the previously deposited metal along with additional metal powder to form an additional layer metallurgically bonded to the first layer, and
    c) repeating step b) to produce multiple layers until a ridge of metal is formed along said path, said ridge having a substantially uniform height and width, and
    d) sharpening the ridge so formed to suit it for use in cutting.

2. A process according to claim 1, wherein the metal base is cylindrical, the process including rotating the base to provide one component of relative motion between said base and said laser beam.

3. A process according to claim 1, wherein after said sharpening step, said ridge is heat treated using heat from said laser beam.

4. A method of manufacturing a cutting die, said cutting die including a die body and a cutting blade formed in a pattern and integral with said die body and extending outwardly from said die body; said method comprising steps of:
    a) heating an area of said die body by scanning an area with a laser to form a puddle of melted die body material in said area in the surface of said die body along a path corresponding to said pattern, said area being greater than an area of said die body on which said laser directly impinges;
    b) upon forming said puddle, applying a blade material in the form of a powder to said puddle while continuing said step of heating said die body corresponding to said path such that said powder is melted in said puddle and at a surface thereof to form a deposit comprising said blade material extending from said surface, said blade material having a hardness greater than said die body material;
    c) continuing performance of steps a) and b) along the entirety of said pattern; and
    d) machining at least side surfaces of said deposit comprising blade material to form said blade corresponding to said pattern and extending from said die body surface.

5. A method as in claim 4 including the further step of:
    building said blade of said blade material outwardly from said surface in a single pass of said laser.

6. A method as in claim 4 wherein the die body surface is cylindrical and said heating step includes heating an area of said die body surface with said laser and introducing said blade material into the heated area while heating said area to completely build said blade on said cylindrical die body surface.

7. A method as in claim 4 wherein said applying step includes introducing said powder, wherein said powder comprises a carbide, into the heated area while heating said area for building said blade.

8. A method as in claim 4 wherein said machining step includes shaping said blade by electrical discharge machining.

9. A method as in claim 4 wherein said machining step includes shaping said blade by milling.

10. A method as in claim 4 wherein said machining step includes shaping said blade by grinding.

11. A method as in claim 4 including the further step of heat treating said blade.

12. A method as in claim 4 including the further step of cryogenic treatment of said blade.

13. A method as in claim 4 wherein said die body material is of less than 60 Rockwell C hardness and said applying step includes:
    introducing a carbide-containing high grade material of at least about 60 Rockwell C hardness into said puddle while heating said die body material along said pattern to build up a die blade in said pattern.

14. A method as in claim 13 including heat treating said die blade after said machining to harden said die blade.

15. A method as in claim 4 wherein said applying step includes introducing cladding powder selected from the group consisting of D2 steel, CMP10V steel, CMP15V steel and a nickel based superalloy with 30-40% volume fraction of tungsten carbide.

16. The method as in claim 4 wherein said die body is cylindrical, the method including rotating said die body to provide one component of relative motion between said die body and said laser.

17. A method as recited in claim 4, wherein said deposit comprising said blade material is formed having a generally half elliptical cross-section.

18. A method as recited in claim 17, wherein said machining step forms a cross-section having substantially linear sides within said half elliptical cross-section of said deposit comprising blade material.

19. A method as recited in claim 18, wherein said cross-section having substantially linear sides approximates a trapezoid.

20. A method as recited in claim 4, including further steps of
    repeating steps a), b) and c) prior to performing step d) to build up a deposit of blade material having a near net cross-sectional shape, said near net shape approximating the cross-sectional shape to be developed by step d), in multiple layers.

21. A method as recited in claim 4 wherein said pattern includes portions which intersect with other portions of said pattern.

22. A method as in claim 21 including a further step of heat treating said blade after said machining step.

23. A method as in claim 21 including a further step of cryogenic treatment of said blade after said machining step.

24. The method as in claim 4 wherein said applying step includes feeding said blade material by a feeder coaxial with a beam of said laser to heat said blade material while heating said area.

25. A cutting die including a die body and a cutting blade formed in a pattern and integral with said die body and extending outwardly from said die body, said cutting die being formed by steps of:
   a) heating an area of said die body by scanning said area with a laser to form a puddle of melted die body material in said area in the surface of said die body along a path corresponding to said pattern, said area being greater than an area of said die body on which said laser directly impinges;
   b) upon forming said puddle, applying a blade material in the form of a powder to said puddle while continuing said step of heating said die body corresponding to said path such that said powder is melted in said puddle and at a surface thereof to form a substantially half elliptical deposit comprising said blade material extending from said surface, said blade material having a hardness greater than said die body material;
   c) continuing performance of steps a) and b) along the entirety of said pattern; and
   d) machining at least side surfaces of said deposit comprising blade material to form said blade corresponding to said pattern and extending from said die body surface.

26. The cutting die as in claim 25 wherein said applying step includes feeding said blade material by a feeder coaxial with a beam of said laser to heat said blade material while heating said area.

* * * * *